Dec. 6, 1938. L. M. MOBLEY 2,138,979
DISPENSING SPOOL FOR ADHESIVE TAPE OR THE LIKE
Filed Jan. 28, 1938
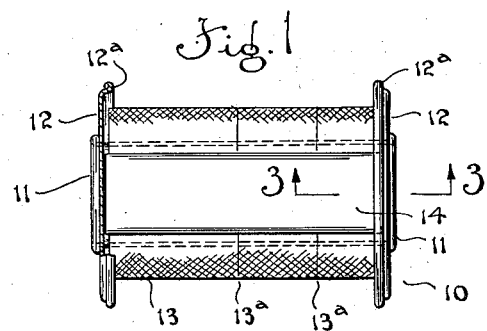
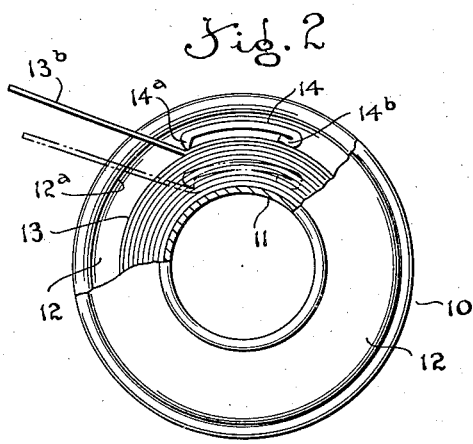
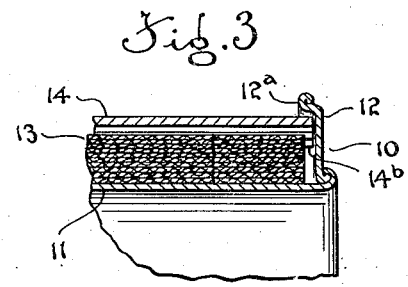
Inventor
Loyd M. Mobley
By
Attorney Patented Dec. 6, 1938

2,138,979

UNITED STATES PATENT OFFICE 2,138,979

DISPENSING SPOOL FOR ADHESIVE TAPE OR THE LIKE

Loyd M. Mobley, Akron, Ohio

Application January 28, 1938, Serial No. 187,448

2 Claims. (Cl. 206—52)

This invention relates to dispensing spools for adhesive tape or the like and particularly to such a spool having a cutting or tearing-facilitating implement permanently associated therewith in a simple, economical manner.

Heretofore, it has been proposed to provide cutters for use with adhesive tape spools either mounted thereon or as separate cutters designed to be used with such spools for cutting off, or aiding in tearing off, a desired length of adhesive tape. These devices have not been entirely satisfactory and have not been generally used.

The purpose of the present invention is to provide a simple, effective combination of a spool and a cutter so associated that the latter is permanently retained in the spool for effective use on the material until the material is used up.

The foregoing and other purposes of the invention are attained in the combined spool and cutter illustrated in the accompanying drawing and described below. It is to be understood that the invention is not limited to the specific form thereof shown and described.

Of the accompanying drawing:

Figure 1 is a plan view, partly broken away and in section, of a combined spool and cutter embodying the invention.

Figure 2 is an end elevation thereof partly broken away and in section.

Figure 3 is an enlarged section on line 3—3 of Figure 2.

Referring to the drawing, the numeral 10 designates generally a spool of adhesive tape which spool is usually made of sheet metal and comprises a central tube 11 providing the core of the spool and annular flanges 12, 12, the tape 13 being wound on the core 11 between flanges 12, 12 and usually being cut as indicated at 13ª, 13ª to provide strips of tape 13 of various widths.

In accordance with the present invention, a cutter plate 14 is provided which is preferably curved somewhat (see Figure 2) concentrically of the spool and which preferably has an inwardly bent and sharpened cutter blade at 14ª and an inwardly bent fulcrum element at 14ᵇ, the cutter plate 14 being of such length (see Figure 3) as snugly to fit between flanges 12 and of such width as to be substantially limited in rocking movement between the flanges 12 out of normal axial alignment with the spool. The flanges 12 are bent inwardly about the spool core as indicated at 12ª, 12ª and hence retain the cutter 14 permanently with the spool and in readiness for use whenever tape 13 is to be removed therefrom for use. The cutter is radially and circumferentially adjustable freely to a desired position for use but is permanently retained in the spool by the outwardly embracing inwardly turned portions 12ª of the spool flanges.

In use the cutter plate 14 will be adjusted about the spool as required to position the blade 14ª as shown in Figure 2 in the desired place where a strip of tape 13ᵇ withdrawn from the spool is to be cut off. The operator then places his thumb on the cutter plate 14, pressing the blade 14ª into the material about the fulcrum 14ᵇ and then tears the strip 13ᵇ off at the cutter blade. As shown in Figure 2, the cutter may be so operated on the tape 13 until it is all used and because of the width of the cutter and the slight clearance lengthwise between it and the inwardly bent flanges 12, the cutter is permanently retained in the spool until the supply of tape is exhausted.

Modifications of the invention may be resorted to without departing from the spirit thereof or the scope of the appended claims.

What is claimed is:

1. In a spool of adhesive tape or the like having side flanges between which the tape is wound, the combination of a cutting plate of substantial width loosely but snugly fitted between the flanges of the spool and supported on the tape, the outer edges of said flanges being inwardly directed to prevent displacement of the cutting plate from between the flanges, and said plate being free to move inwardly on the tape as the tape is unwound and used.

2. In a spool of adhesive tape or the like having side flanges between which the tape is wound, the combination of a cutting plate of substantial width loosely but snugly fitted between the flanges of the spool and riding on the tape, the outer edges of said flanges being inwardly directed to prevent displacement of the cutting plate from between the flanges, said cutting plate having an inwardly directed cutting edge at one side thereof and an inwardly directed fulcrum member adapted to be supported on the tape at the other side thereof, and said plate being free to move inwardly on the tape as the tape is unwound and used.

LOYD M. MOBLEY.